(12) United States Patent
Hogari et al.

(10) Patent No.: US 6,646,422 B2
(45) Date of Patent: Nov. 11, 2003

(54) BATTERY PACK

(75) Inventors: Masaki Hogari, Fukushima (JP);
Shuichiro Maekawa, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/872,041

(22) Filed: Jun. 1, 2001

(65) Prior Publication Data

US 2002/0017896 A1 Feb. 14, 2002

(30) Foreign Application Priority Data

Jun. 2, 2000 (JP) ........................... P2000-170431

(51) Int. Cl.$^7$ .................................................. H02J 7/00
(52) U.S. Cl. ........................................ 320/134; 320/136
(58) Field of Search ................................ 320/134, 136, 320/127, 128, 132, 135; 324/426, 427; 340/636

(56) References Cited

U.S. PATENT DOCUMENTS 5,789,900 A * 8/1998 Hasegawa et al. .......... 320/132
5,909,103 A * 6/1999 Williams .................... 320/134

* cited by examiner

*Primary Examiner*—Lawrence Luk
(74) *Attorney, Agent, or Firm*—Sonnenschein, Nath & Rosenthal LLP

(57) ABSTRACT

A battery pack mounted to a predetermined apparatus to permit supply and output of power of a secondary battery cell between the battery pack and the apparatus, comprising: a plurality of field effect transistors for stopping charge or discharge current in response to a control signal; and a control circuit for controlling the charge or discharge current of the secondary battery cell by outputting control voltage for controlling the field effect transistors; wherein the control voltage is supplied to the respective gates of the plurality of field effect transistors through resistors of 10 [kΩ] or more.

11 Claims, 9 Drawing Sheets

| | BATTERY CELL VOLTAGE: 4V<br>FET SOURCE-TO-DRAIN RESISTANCE | BATTERY CELL VOLTAGE: 2V<br>FET SOURCE-TO-DRAIN RESISTANCE | FET1<br>GATE-TO-SOURCE RESISTANCE | FET2<br>GATE-TO-SOURCE RESISTANCE |
|---|---|---|---|---|
| BEFORE BREAKDOWN BY STATIC ELECTRICITY | 27mΩ | 300KΩ | 120MΩ | 120MΩ |
| AFTER BREAKDOWN BY STATIC ELECTRICITY | 54mΩ | 2KΩ | 120MΩ | 1KΩ |

| | BATTERY CELL VOLTAGE:4V<br>FET SOURCE-TO-DRAIN RESISTANCE | BATTERY CELL VOLTAGE:2V<br>FET SOURCE-TO-DRAIN RESISTANCE | FET1<br>GATE-TO-SOURCE RESISTANCE | FET2<br>GATE-TO-SOURCE RESISTANCE |
|---|---|---|---|---|
| BEFORE BREAKDOWN BY STATIC ELECTRICITY | 27mΩ | 300KΩ | 120MΩ | 120MΩ |
| AFTER BREAKDOWN BY STATIC ELECTRICITY | 2KΩ | 2KΩ | 120MΩ | 1KΩ |

BATTERY PACK

RELATED APPLICATION DATA

This application claims priority to Japanese Patent Application JP 2000-170431, and the disclosure of that application is incorporated herein by reference to the extent permitted by law.

BACKGROUND OF THE INVENTION

1. Field of the Invention

This invention relates to a battery pack and is applicable to a battery pack based on a lithium-ion secondary battery, for instance.

2. Description of the Related Art

Conventionally, a battery pack based on a lithium-ion secondary battery is adapted to prevent over-voltage charge and under-voltage discharge by use of a control IC for controlling operations of switching field effect transistors.

Figure 6:
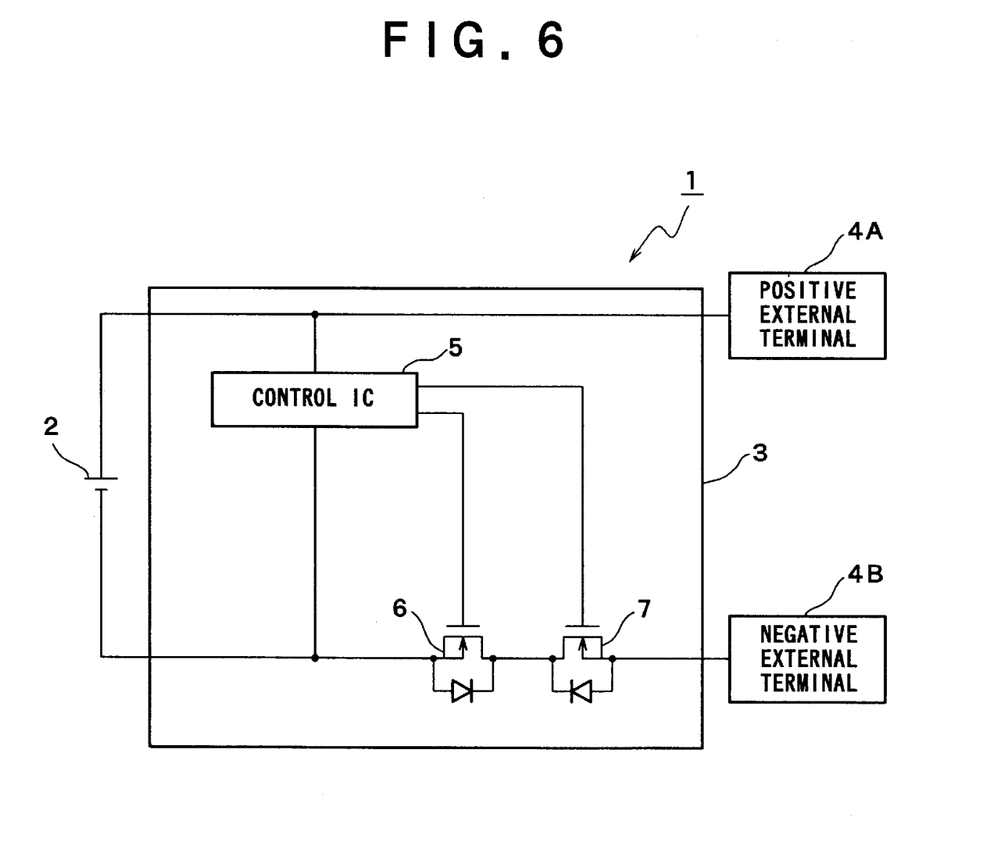
FIG. 6 is a connection diagram showing a battery pack in the related art.

FIG. 6 is a connection diagram showing a battery pack. That is, a battery pack 1 has a secondary battery cell 2 and a protective circuit 3 respectively housed in a predetermined case. The battery pack 1, when mounted to a charging device or a loading device, enables charge and discharge currents to be supplied and outputted between the charging device or the loading device and the secondary battery cell 2 through a positive external terminal 4A and a negative external terminal 4B.

In the battery pack 1, a terminal voltage of the secondary battery cell 2 and terminal voltage between the positive external terminal 4A and the negative external terminal 4B or the like are monitored by use of the control IC 5 to permit switching field effect transistors 6, 7 placed in a charge and discharge path to be on-off controlled according to the monitoring results. That is, the battery pack 1 is structured that discharge and charge-control N-channel field effect transistors 6, 7 are placed in series in the charge and discharge path between the negative external terminal 4B and a negative terminal of the secondary battery cell 2. Incidentally, parasitic diode is existent between a source and a drain of each of the N-channel field effect transistors 6, 7 for the structural reasons. Therefore, when the terminal voltage of the secondary battery cell 2 is reduced down to a predetermined value or less, the battery pack 1 switches over the discharge-control field effect transistor 6 to the Off-state to prevent under-voltage discharge. On the other hand, when the terminal voltage of the secondary battery cell 2 is increased up to a predetermined value or more, the battery pack switches over the charge-control field effect transistor 7 to the Off-state to prevent over-voltage charge.

Figure 7:
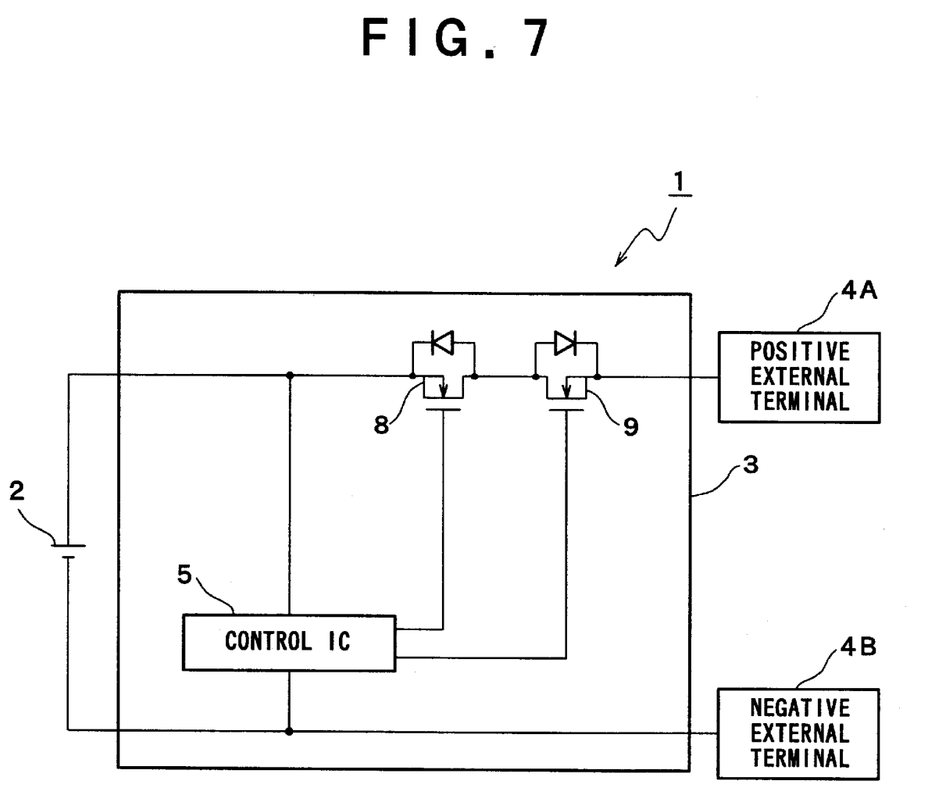
FIG. 7 is a connection diagram showing a battery pack, in which P-channel field effect transistors are in use, instead of N-channel field effect transistors.

Incidentally, the battery pack 1 applies P-channel field effect transistors 8, 9, instead of the N-channel field effect transistors 6, 7, to constitute the switching means in some cases as shown in FIG. 7.

Figure 8:
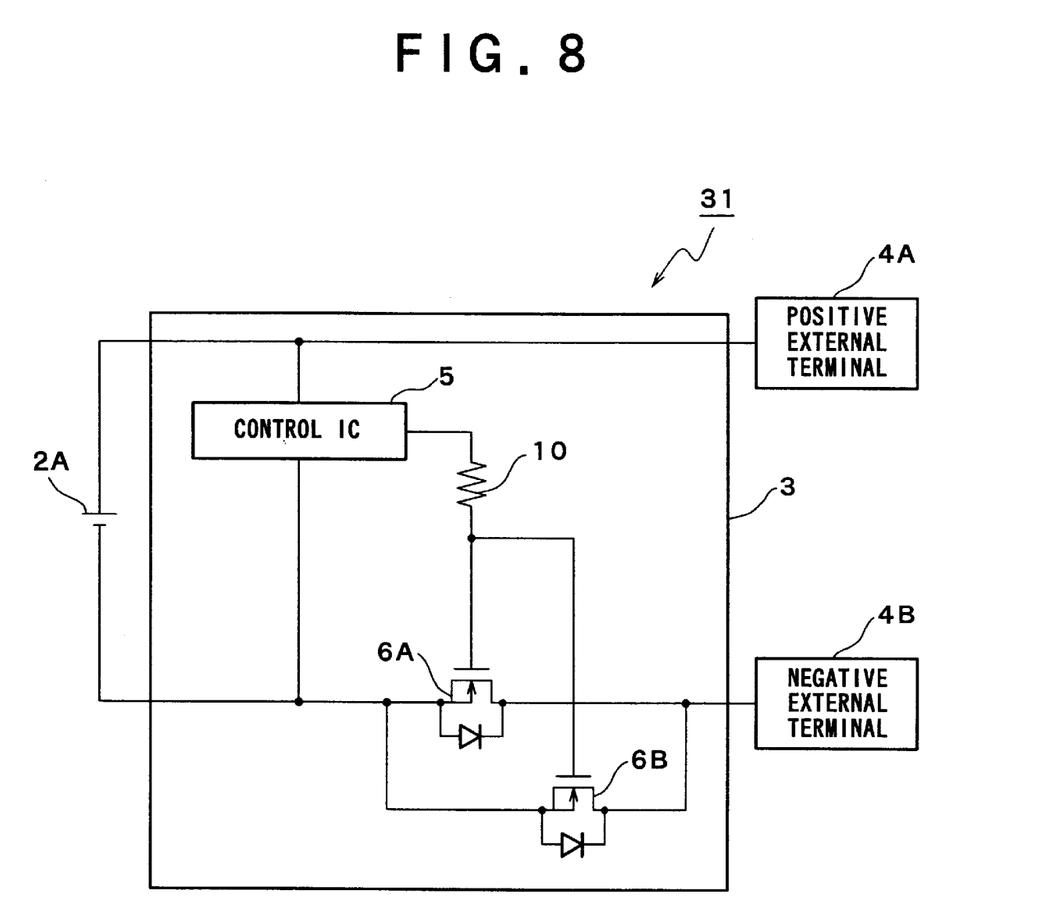
FIG. 8 is a connection diagram showing a battery pack structured that field effect transistors are connected in parallel.

When high charge and discharge currents are required, the battery pack 31 is structured that the field effect transistors constituting the switching means are connected in parallel to control charge and discharge currents as shown in FIG. 8 by contrast with FIG. 6. That is, the battery pack 31 is provided to supply a control signal outputted from the control IC to gates of the field effect transistors 6A, 6B through a resistor 10. Incidentally, FIG. 8 shows only the discharge-control field effect transistors 6A, 6B without a description of the charge-control field effect transistors. It is to be understood that output impedance of a control signal output terminal in the control IC is considered to be ordinaryly 10 [KΩ] or more, which corresponds to an equivalent circuit having the resistor 10 connected in series.

Incidentally, a user sometimes carries the battery pack of this kind in one's hand in use, and as a result, high voltage caused by static electricity is applied to the battery pack on such occasions. While the high voltage caused by the static electricity is limited to about 6 to 15 [kV], application of voltage of several [kV] or more is considered to be enough to cause breakdown of the field effect transistors. Accordingly, it is feared that breakdown of the field effect transistors might be caused by static electricity when the user frequently carries the battery pack in one hand in use.

With the breakdown of the field effect transistors caused by the static electricity or the like in the conventional battery pack, a source-to-drain resistance value of the field effect transistor is increased, resulting in difficulty in using the battery pack structured that each of the charge and discharge-control field effect transistors constituting the switching means is placed individually in the charge and discharge path as described in FIGS. 6 and 7. In this connection, while the source-to-drain resistance value is limited to 100 [mΩ] or less in a ordinary condition, while being increased up to 1 [kΩ] or more in consequence of the breakdown as described the above.

On the other hand, in the battery pack structured that the field effect transistors are connected in parallel as described in FIG. 8, the breakdown of only one of the parallel connected field effect transistors is supposed to be caused by static electricity. In this case, when a large number of field effect transistors are connected in parallel and so on, each field effect transistor makes sure of a capacity enough to permit the remaining field effect transistors to apply sufficient charge and discharge currents in some cases. The battery pack, if made available for such a case, is considered to be convenient. However, the conventional battery pack presents a problem in difficulty in making the battery pack available for such a case.

A description will now be given by taking the case of the battery pack having the structure shown in FIG. 8. That is, the control IC is provided to set the discharge-control field effect transistors 6A, 6B to the On-state and the Off-state on the basis of the rise and fall of gate control voltage of the discharge-control field effect transistors 6A, 6B. The voltage required for setting the discharge-control field effect transistors to the On-state is set at a value approximately equal to the terminal voltage of the secondary battery cell 2, for instance. On the other hand, there is a need for setting the gate control voltage at approximately 0 [V] to set the discharge-control field effect transistors to the Off-state. When the terminal voltage of the secondary battery cell is reduced down to 2 [V], the control IC for use in the lithium-ion secondary battery switches over the field effect transistors 6A, 6B from the On-state to the Off-state.

The resistor 10 in the battery pack is set to have a resistance value of about 100 [kΩ] so that a gate-to-source resistance value in each of the field effect transistors 6A, 6B comes to about 1 to 200 [MΩ] in a ordinary condition. Thus, the control IC 5 makes it possible to set the terminal voltage of the control terminals at 4 [V] and 0 [V] for setting the gate voltage of the field effect transistors 6A, 6B at 4 [V] and 0 [V] respectively.

The least gate-to-source voltage required for maintaining the source-to-drain resistance value of each of the field effect transistors 6A, 6B smaller is about 1.5 [V]. Accordingly, the battery pack makes it possible to set the terminal voltage of the control terminals at 4 [V] and 0 [V] for setting the field effect transistors 6A, 6B to the On-state and the Off-state.

Figure 9:
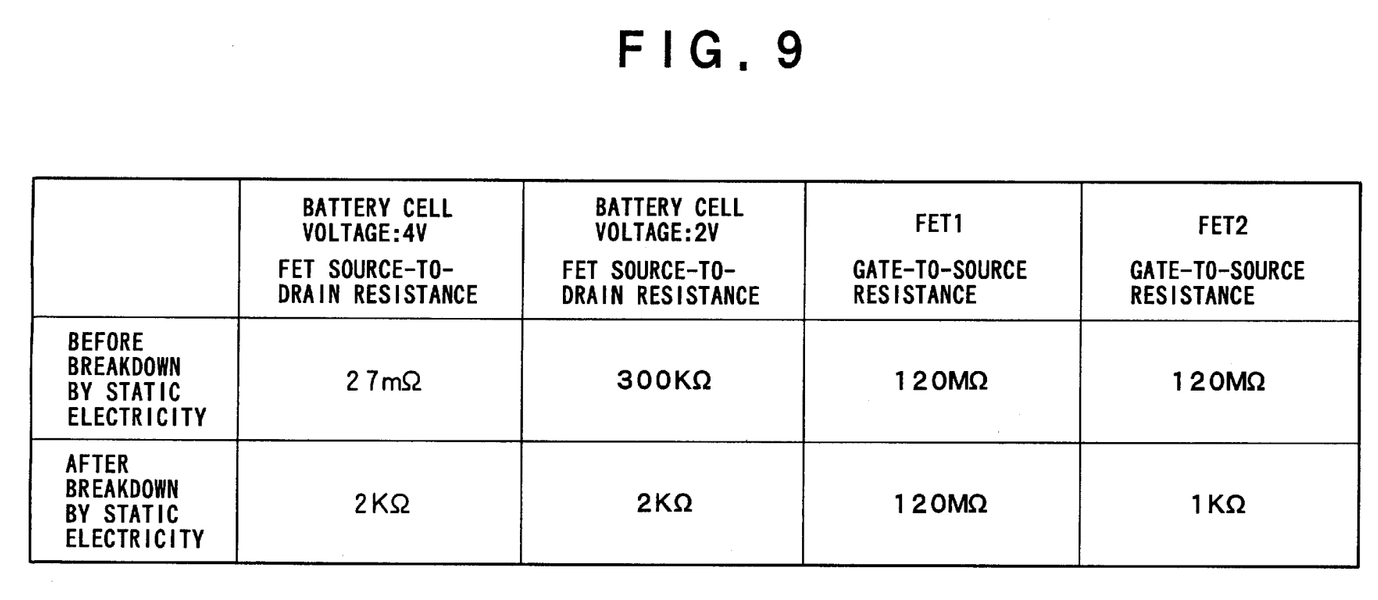
FIG. 9 is a table for explaining the operation of the battery pack in FIG. 8.

On the other hand, when the breakdown of the field effect transistors is caused by static electricity or the like, the gate-to-source resistance of the field effect transistor is reduced down to about 1 [kΩ]. Assuming that the breakdown of the field effect transistor 6A is caused by static electricity, for instance, the gate-to-source voltage in the undamaged-side field effect transistor 6B is also reduced down to about 0 [V], resulting in difficulty in setting the field effect transistor 6B to the On-state. Incidentally, FIG. 9 shows a resistance value of each part in the constitution of the battery pack shown in FIG. 8 without a description of the charge-control field effect transistors. In FIG. 9, the source-to-drain resistance value of the field effect transistor is given as the total resistance value of the two field effect transistors 6A, 6B. According to the table in FIG. 9, since the total source-to-drain resistance value of the field effect transistors after the breakdown by static electricity reaches 2 [kΩ] even if the terminal voltage of the secondary battery cell 2 is set at 4 [V], it is to be understood that supplied discharge current is limited to 2 [mA](4 [V]÷2 [kΩ]) regardless of short-circuiting of a load. For that reasons, when the breakdown of one of the field effect transistors is caused by the static electricity, the battery pack permits no supply of discharge current as much as 3 [mA] to 10 [A], which is considered to be the discharge current in the ordinary condition.

SUMMARY OF THE INVENTION

The present invention is made by considering above described points. Accordingly, it would be desired to provide a battery pack having a function of controlling charge and discharge currents by use of parallel-connected field effect transistors, even if breakdown of a part of the field effect transistors is caused, for example, by static electricity.

According to one embodiment of the present invention, there is provided a battery pack having a function of controlling charge current and discharge current by use of parallel-connected field effect transistors constituting charge or discharge-control switching means, available by supplying control voltage to gates of the parallel-connected field effect transistors through resistors of 10 [kΩ] or more, even if breakdown of a part of the field effect transistors is caused by static electricity or the like.

In order to attain the above object, a battery pack according to the present invention takes measures to supply control voltage to gates of a plurality of field effect transistors through resistors of 10 [kΩ] or more.

Accordingly, even if breakdown of any of the field effect transistors is caused by static electricity or the like and the gate-to-source resistance is reduced to an extremely small value, the battery pack constituted to supply the control voltage to the gates of the plurality of field effect transistors through the resistors of 10 [kΩ] or more makes it possible to prevent a reduction of other field effect transistor gate voltage, permitting control of charge and discharge currents by use of the other field effect transistors.

BRIEF DESCRIPTION OF THE DRAWINGS

The foregoing and other objects and features of the invention will become apparent from the following description of preferred embodiments of the invention with reference to the accompanying drawings, in which.

Figure 1:
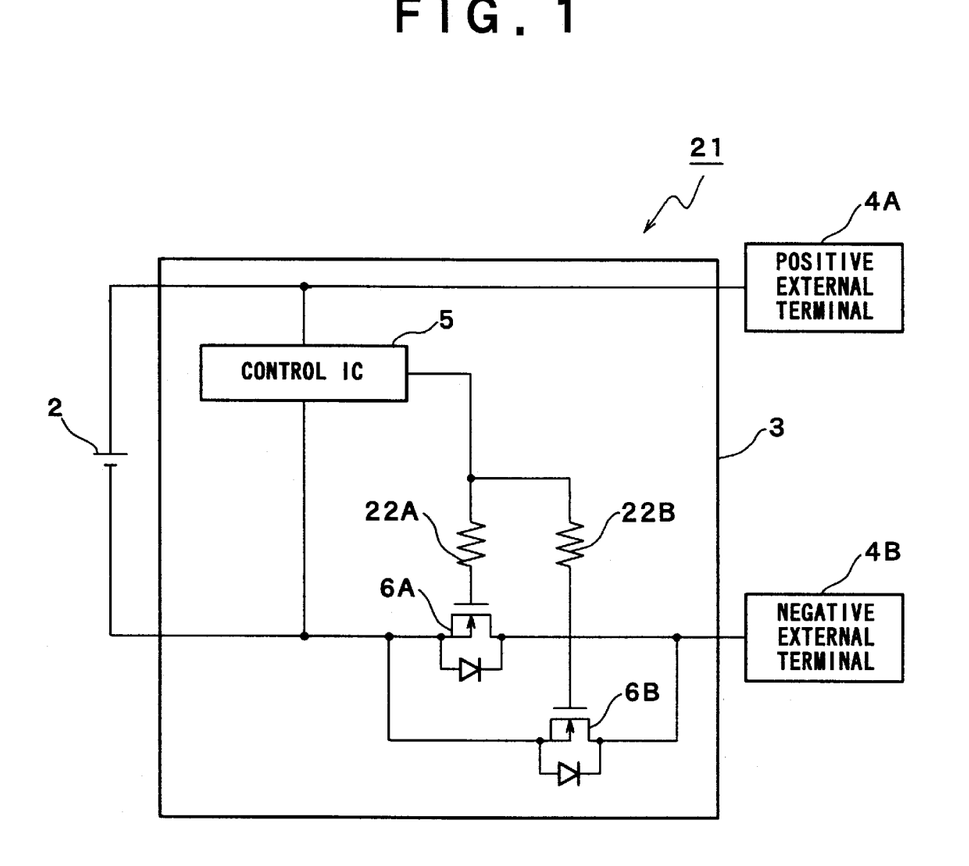
FIG. 1 is a connection diagram showing a battery pack according to the first embodiment of the present invention.

DETAILED DESCRIPTION OF THE PREFERRED EMBODIMENTS (1) First Embodiment
(1-1) Constitution of First Embodiment FIG. 1 is a connection diagram showing a battery pack according to the first embodiment of the present invention by contrast with the battery pack in FIG. 8. In a battery pack 21 shown in FIG. 1, the constituents similar to those of the battery pack previously described in FIG. 8 are denoted by the same reference numerals without a repetitive description thereof. Incidentally, while FIG. 1 shows only discharge-control field effect transistors in the battery pack 21, it is to be understood that charge-control field effect transistors are similar in constitution to the discharge-control field effect transistors.

The battery pack 21 is provided to supply control voltage from a control IC to the respective field effect transistors 6A, 6B through respective resistors 22A, 22B. In this embodiment, a resistance value of each of the resistors 22A, 22B is selectively determined to meet the requirements that even if breakdown of any of the field effect transistors is caused by static electricity or the like to reduce the gate-to-source resistance to a smaller value, a gate voltage enough to switch over the other field effect transistor to the On-state may be applied through the rise of control voltage.

Figure 2A:
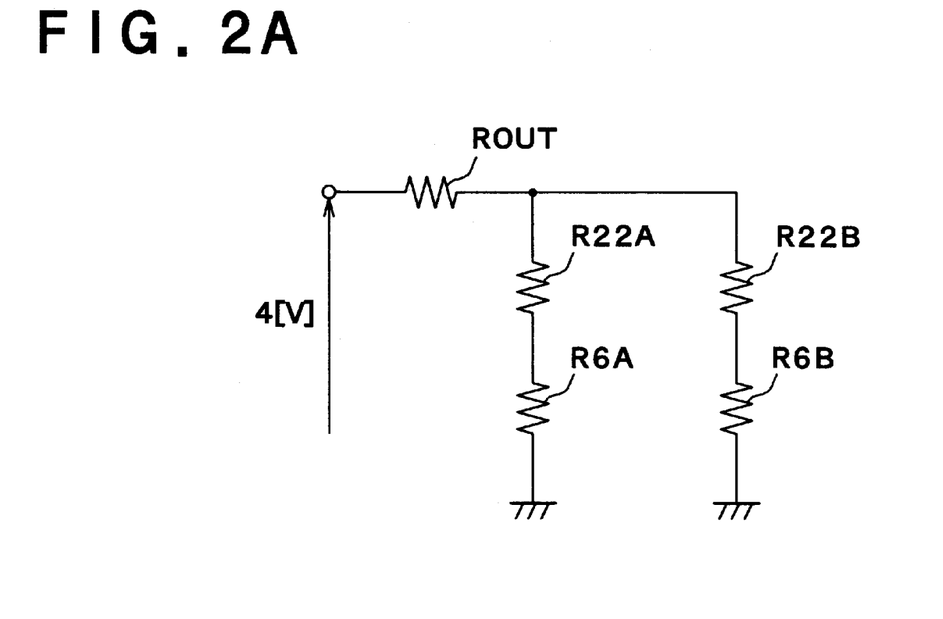
FIGS. 2A, 2B are equivalent circuit diagrams showing the peripheral constitution of a field effect transistor gate of the battery pack in FIG. 1.
Figure 2B:
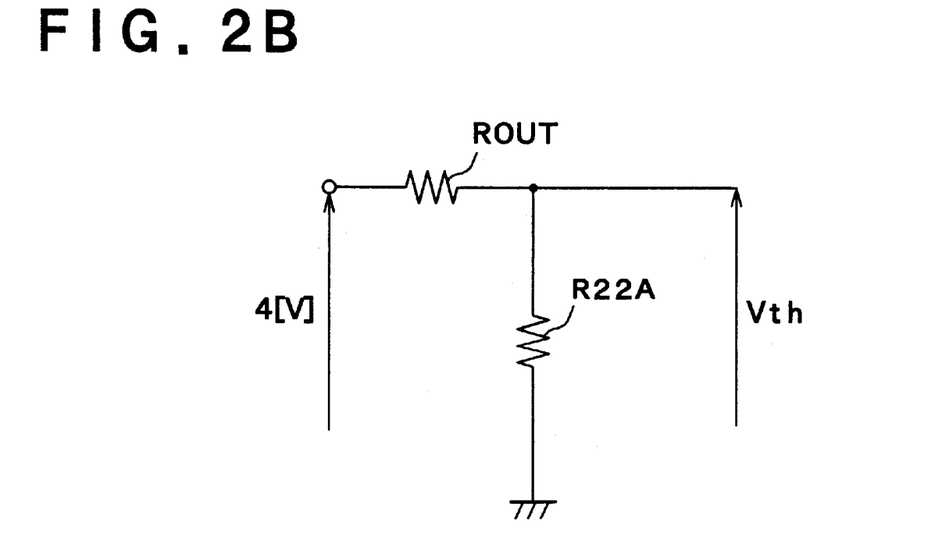

That is, when output impedance of control voltage of the protective IC 5 is denoted by ROUT, resistance values of the resistors 22A, 22B are respectively denoted by R22A, R22B and gate-to-source resistances of the field effect transistors 6A, 6B are respectively denoted by R6A, R6B, the control voltage of the protective IC 5 is expressed as shown in FIG. 2A. Now assuming that breakdown of the field effect transistor 6A is caused by static electricity or the like, the gate-to-source resistance R6A of the field effect transistor 6A is reduced down to several [kΩ], whereas the gate-to-source resistance R6B of the undamaged-side field effect transistor 6B is increased to as high as about 100 [MΩ]. Thus, when the resistance values R22A, R22B of the resistors 22A, 22B are selectively determined to meet the requirements that the gate voltage enough to switch over the other field effect transistor to the On-state may be applied through the rise of control voltage, the control voltage of the protective IC may be expressed as shown in FIG. 2B in the equivalent circuit.

For that reasons, the resistance values R22A, R22B of the resistors 22A, 22B are set to meet the requirements that voltage Vth resulting from dividing the voltage of 4(V) as the rise of the control voltage of the control IC 5 together with the output impedance ROUT of the control IC 5 is made higher than voltage enough to switch over the field effect transistors 6A, 6B to the On-state. In the preferred embodiment, the resistance values R22A, R22B of the resistors 22A, 22B are set at 100 [kΩ] to meet the requirements that the divided voltage Vth is made higher than the voltage enough to switch over the field effect transistors 6A, 6B to the On-state while leaving a sufficient margin. Incidentally, in the control IC 5 provided to on-off control the field effect transistors as the switching means, output impedance ROUT is relatively high in most cases. However, even if the breakdown of one field effect transistor occurs, the control IC provided with the resistor of 10 [kΩ] or more for the gate of each field effect transistor permits sufficient control of charge and discharge by use of the other field effect transistor practically.

(1-2) Operation of First Embodiment

Figure 3:
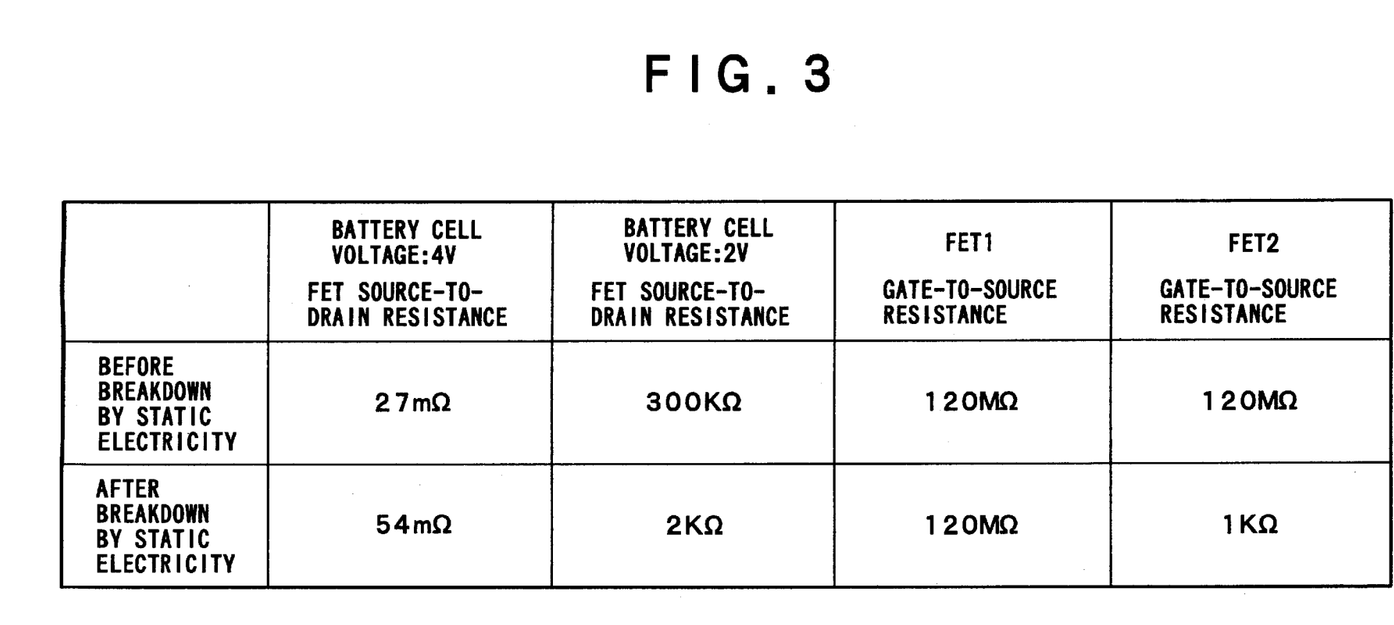
FIG. 3 is a table for explaining the operation of the battery pack in FIG. 1.

In the above embodiment, when the battery pack 21 is connected to a load, power of the battery cell 2 is supplied to the load through the positive external terminal 4A and the negative external terminal 4B. Further, the terminal voltage of the battery cell 2 is monitored by use of the control IC 5. When the terminal voltage reaches 2 [V], the control voltage of the control IC 5 is reduced from 4 [V] to 0 [V]. With the reduction of the control voltage from 4 [V] to 0 [V], the source-to-drain resistance value is switched over from 27 [mΩ] to 300 [kΩ] in a parallel circuit of the field effect transistors 6A, 6B as shown in FIG. 3 by contrast with FIG. 9. Accordingly, the field effect transistors 6A, 6B are switched over to the Off-state to control the stop of power supplied to the load, resulting in a prevention of under-voltage discharge.

On the other hand, when the battery pack is connected to a charging device, power of the charging device is supplied to the battery cell 2 through the positive external terminal 4A and the negative external terminal 4B. Further, charge voltage is monitored by use of the control IC 5. Then, when the charge voltage reaches a predetermined value, the control voltage of the control IC 5 is reduced from 4 [V] to 0 [V] with respect to the charge-control field effect transistors (not shown). In this case, the charge-control field effect transistors are also switched over from the On-state to the Off-state to control the stop of charging, resulting in a prevention of over-voltage charge.

In control of charge and discharge as described the above, when the breakdown of the field effect transistor 6a is caused by static electricity, for instance, the source-to-drain resistance value is changed from 57 [mΩ] to 2 [kΩ], while the gate-to-drain resistance value is changed from 120 [MΩ] to 1 [kΩ] in the damaged field effect transistor 6A. Accordingly, the battery pack 1 in case of setting the terminal voltage of the secondary battery cell 2 at about 4 [V] short-circuits the terminals 4A, 4B to permit the current of about 2 [mA] to flow. On the other hand, the field effect transistor 6A is held in the approximately Off-state to be placed in the state that the gate voltage is reduced to approximately 0 [V] as it is.

However, regardless of the reduction of the gate voltage of the field effect transistor 6A, the battery pack 21 makes it possible to apply the voltage enough to switch over the remaining ordinary field effect transistor 6B to the On-state to the gate of the field effect transistor 6B through the resistor 22A provided for the gate of the field effect transistor 6A on the rise of the control voltage up to 4 [V], permitting control of discharge operation by use of the undamaged-side field effect transistor.

As to the charge-control operation, even if breakdown of one field effect transistor occurs, the battery pack 21 permits control of charging by use of the undamaged-side field effect transistor in the similar manner.

Incidentally, since the current of about 2 [mA] is permitted to flow through short-circuiting of the external terminals if the breakdown of one field effect transistor occurs as described the above, the battery pack, when being allowed to stand as it is connected to the load and further to the charging device, is supposed to be in danger of under-voltage discharge and over-voltage charge. However, when the battery pack is connected to the load and the charging device, it is considered that the charge and discharge currents based on the breakdown-side field effect transistor are reduced to a further smaller current value in fact, resulting in no possibility of degrading reliability.

(1-3) Effect of First Embodiment

According to the above constitution, even if the breakdown of a part of the field effect transistors is caused by static electricity or the like, the battery pack provided to control charge and discharge currents by use of the parallel-connected field effect transistors is made available by supplying the control voltage to the gates of the field effect transistors through the resistors of about 10 [kΩ] or more.

(2) Second Embodiment

Figure 4:
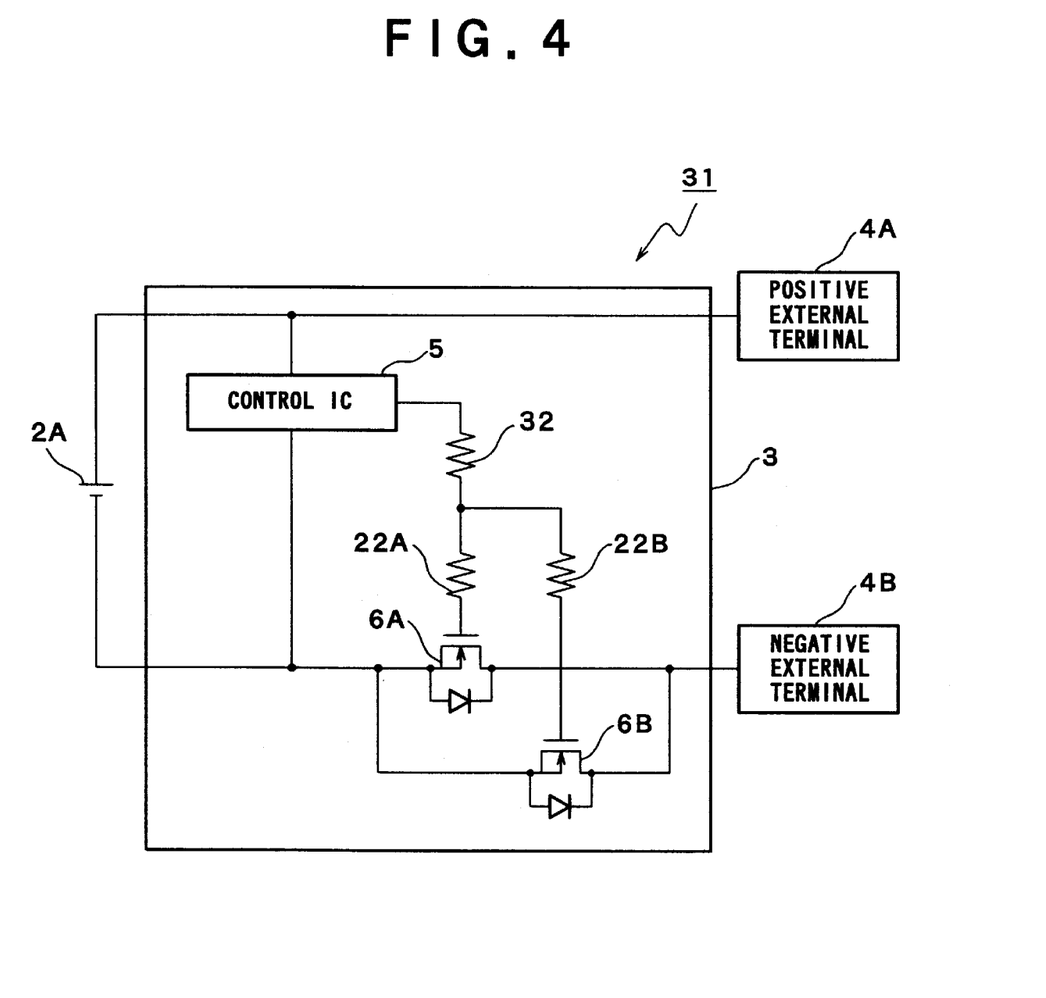
FIG. 4 is a connection diagram showing a battery pack according to the second embodiment of the present invention.

FIG. 4 is a connection diagram showing a battery pack according to the second embodiment of the present invention. A battery pack 31 is provided to apply control voltage to the resistors 22A, 22B through a resistor 32 as shown in FIG. 4 by contrast with the battery pack 21 of FIG. 1. In the battery pack 31 shown in FIG. 4, the constituents similar to those of the battery pack 21 in FIG. 1 are denoted by the same reference numerals without a repetitive description thereof. Incidentally, as to the battery pack 31, the charge-control field effect transistors are also similar in constitution to the discharge-control field effect transistors, and hence, its description will be omitted.

A resistance value of the resistor 32 is selectively determined, together with the resistance values of the resistors 22A, 22B, to meet the requirements that voltage enough to switch over the ordinary field effect transistor 6B to the On-state may be applied to the gate of the field effect transistor 6B on the rise of the control voltage up to 4 [V], regardless of the reduction of the gate voltage of the field effect transistor 6A, for instance. In the second embodiment, the resistance value is set at 10 [kΩ]. Incidentally, it is to be understood that the resistance value of the resistor 32 is set to be smaller than that of the resistors 22A, 22B.

As shown in FIG. 4, the battery pack, even if constituted to apply the control voltage of the control IC 5 to the resistors 22A, 22B provided for the respective gates through the resistor 32, may also have the effects similar to those in the first embodiment.

(3) Third Embodiment

Figure 5:
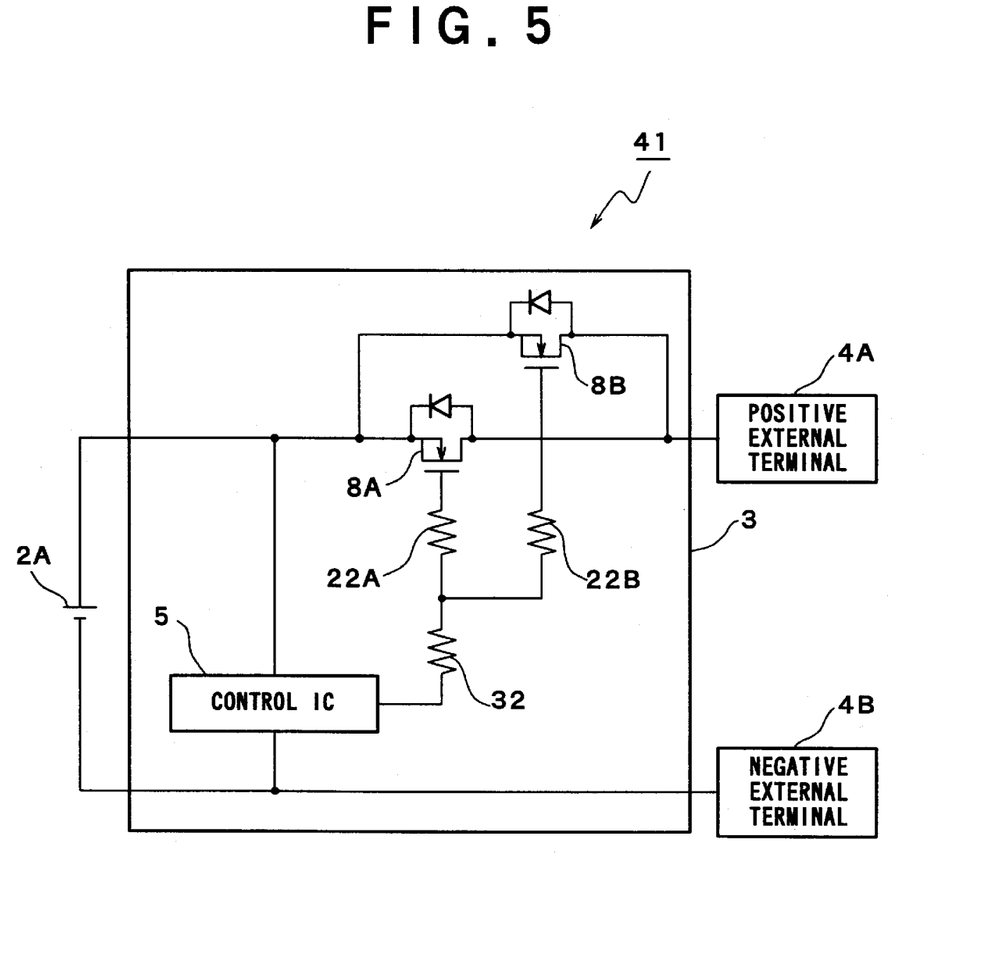
FIG. 5 is a connection diagram showing a battery pack according to the third embodiment of the present invention.

FIG. 5 is a connection diagram showing a battery pack 41 according to the third embodiment of the present invention. In the battery pack 41 shown in FIG. 5, the constituents similar to those of the battery pack 21 in FIG. 1 are denoted by the same reference numerals without a repetitive description thereof. As to the battery pack 41, the charge-control field effect transistors are also similar in constitution to the discharge-control field effect transistors and hence, its description will be omitted.

In the battery pack 41, the discharge current is controlled by P-channel field effect transistors 8A, 8B, instead of the N-channel field effect transistors 6A, 6B, while the charge current is also controlled by the parallel-connected P-channel field effect transistors.

As shown in FIG. 5, the battery pack, even if applying the P-channel field effect transistors to constitute the switching means, instead of the N-channel field effect transistors, may have also the effects similar to those in the first embodiment.

(4) Other Embodiments

While the foregoing description has been given of the embodiments of the battery pack structured that two field effect transistors are connected in parallel to constitute the switching means, it is to be understood that the present invention is not limited to the above embodiments and is also widely applicable to a battery pack structured that three or more transistors are connected to constitute the switching means.

While the foregoing description has been given of the embodiments of the battery pack used for preventing over-voltage charge and under-voltage discharge under control of the field effect transistors, it is also to be understood that the present invention is not limited to the above embodiments and is also applicable to a battery pack used for preventing over-current discharge and over-current charge.

While the foregoing description has been given of the embodiments applied to the battery pack based on the lithium-ion secondary battery, it is to be understood that the present invention is not limited to the above embodiments and is also widely applicable to a variety of battery packs such as nickel-metal hydride battery.

According to the present invention, even if the breakdown of a part of the field effect transistors is caused by static electricity or the like, the battery pack provided to control charge and discharge currents by use of the parallel-connected field effect transistors constituting the charge or discharge-control switching means is made available by supplying control voltage to the gates of the field effect transistors through the resistors of 10 [kΩ] or more.

A battery pack in accordance with the present invention may be used as a power supply for various electronic apparatus such as a portable computer apparatus.

What is claimed is:

1. A circuit configured to couple a power source and a battery, said circuit comprising:

a plurality of field effect transistors coupled in parallel and configured to be coupled between said battery and said power source; and a control circuit with an output coupled to the gate of each field effect transistor via a respective resistance of at least 10 kilo-ohms, said control circuit operatively configured to cause said field effect transistors to switch on and off as necessary to permit transfer of power between said power source and said battery.

2. The circuit according to claim 1, wherein said field effect transistors include N-channel field effect transistors placed in a charge or discharge path on the negative side of said secondary battery cell.

3. The circuit according to claim 1, wherein said field effect transistors include P-channel field effect transistors placed in a charge or discharge path on the positive side of said secondary battery cell.

4. The circuit according to claim 1, wherein it further comprises a lithium-ion secondary battery.

5. The circuit according to claim 1, wherein discharge- and charge-control N-channel field effect transistors are placed in series in a charge or discharge path between a negative external terminal and a negative terminal of the secondary battery cell, and a parasitic diode is existent between a source and a drain of a circuit line in said N-channel field effect transistors.

6. An apparatus including the circuit according to claim 1.

7. A battery pack that transfers power between a secondary battery and an apparatus, said battery pack including a circuit comprising:

a plurality of field effect transistors useful for switching either a discharge or a charge current through;

a control circuit configured to generate a control signal useful for controlling switching of said field effect transistors; and a plurality of resistors through which said control signal is applied to gates of said field effect transistors, wherein,
      said field effect transistors are coupled in parallel with each other,
      said filed effect transistors are coupled between said battery and said apparatus,
      each field effect transistor is associated with a unique resistor, and
      each resistor has a resistance of at least 10 kilo-ohms.

8. The battery pack according to claim 7, wherein said field effect transistors include N-channel field effect transistors placed in a charge or discharge path on the negative side of said secondary battery cell.

9. The battery pack according to claim 7, wherein said field effect transistors include P-channel field effect transistors placed in a charge or discharge path on the positive side of said secondary battery cell.

10. The battery pack according to claim 7, wherein it further comprises a lithium-ion secondary battery.

11. The battery pack according to claim 7, wherein discharge- and charge-control N-channel field effect transistors are placed in series in a charge or discharge path between a negative external terminal and a negative terminal of the secondary battery cell, and a parasitic diode is existent between a source and a drain of a circuit line in said N-channel field effect transistors.

* * * * *